(12) United States Patent
Spitulski

(10) Patent No.: US 11,962,638 B2
(45) Date of Patent: Apr. 16, 2024

(54) DIFFERENTIAL DATA TRANSFER USING CONGESTION CONTROL

(71) Applicant: NVIDIA Corporation, Santa Clara, CA (US)

(72) Inventor: Frank James Spitulski, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/840,371

(22) Filed: Jun. 14, 2022

(65) Prior Publication Data

US 2023/0403318 A1 Dec. 14, 2023

(51) Int. Cl.
*H04L 67/02* (2022.01)
*H04L 9/40* (2022.01)
*H04L 69/164* (2022.01)

(52) U.S. Cl.
CPC .......... *H04L 67/02* (2013.01); *H04L 63/0807* (2013.01); *H04L 63/0892* (2013.01); *H04L 69/164* (2013.01)

(58) Field of Classification Search
CPC . H04L 67/02; H04L 63/0807; H04L 63/0892; H04L 69/164
See application file for complete search history.

(56) References Cited

U.S. PATENT DOCUMENTS

| 2012/0131025 | A1* | 5/2012 | Cheung | G06F 16/1752 707/755 |
| 2013/0138775 | A1* | 5/2013 | Shah | H04L 67/568 709/219 |
| 2021/0266265 | A1* | 8/2021 | Choi | H04L 47/11 |
| 2021/0288738 | A1* | 9/2021 | Byagowi | H05K 7/1491 |
| 2022/0131851 | A1* | 4/2022 | Singh | H04L 67/02 |
| 2022/0394076 | A1* | 12/2022 | Willars | H04L 65/75 |

* cited by examiner

*Primary Examiner* — Chris Parry
*Assistant Examiner* — Steven C Nguyen
(74) *Attorney, Agent, or Firm* — Leydig, Voit & Mayer, Ltd.

(57) ABSTRACT

Systems and methods related to transferring (e.g., large) files over a network are disclosed. In at least one embodiment, a client-server framework establishes a QUIC connection between a server application and a client application. Source files are processed by the server application to divide the source files into a number of chunks. Differential file transfer can be implemented between the client application and the server application by comparing metadata for chunks of the source file with metadata of local chunks of a destination file already stored in a local storage associated with the client application. Missing chunks can be requested from the server application and transferred to the client application using HTTP/3 messages.

22 Claims, 10 Drawing Sheets

DIFFERENTIAL DATA TRANSFER USING CONGESTION CONTROL

BACKGROUND

In various network services, there exists a need to store and transfer large files between data centers. For example, a video streaming service may store copies of video files in a number of data centers around the world to make those videos available to devices of customers on demand. As another example, a game streaming service may store groups of files related to executing a game application in multiple data centers that include servers configured to process user feedback (e.g., controller feedback, keyboard input, etc.) and generate frames of the game for distribution to a client device for display.

Whenever these files are updated or new files are distributed, such as when a new episode is made available on a streaming platform, a bug is patched, or a new DLC (downloadable content) is released for a game application, large file transfers may need to be executed between the different data centers. There is a need for addressing these issues and/or other issues associated with the prior art to improve the transfer of files over a network. In certain cases, very large files need to be updated regularly and copied to many data centers from a central location. Data centers can be located worldwide, and data transfers between data centers often are associated with poor connections (e.g., high ping response times, intermittent availability, etc.) with high packet loss, which can typically result in extreme throughput loss. These obstacles can make file transfer difficult.

One conventional solution to this problem is provided by IBM® Aspera—a software solution that provides secure transport of large data files. Aspera is designed to solve the issue with poor connections, but requires the entire file to be copied from one endpoint in one data center to the other endpoint in another data center. In other words, Aspera does not include functionality for differential file transfer when only a small part of a large file is changed due to an update. In a use case where a large file is being updated, such that only a small portion of the file may need to be transferred to the target data center, such a solution is not ideal as it can require a large time and extra network bandwidth to transfer even a small update to a large file.

Another solution to this problem is BitTorrent, which refers to a technology that splits files into smaller chunks, and then a client can download chunks from any source to a target endpoint. In BitTorrent, the chunks do not necessarily have to come from the same data center if copies of the chunks are made available in multiple locations (e.g., there are multiple seeders of a file), leading to efficiency gains that help reduce connectivity issues. However, in the use case where a copy of the file is only located in one data center, then this feature of BitTorrent is not useful. Furthermore, BitTorrent may copy the contents of the entire file (e.g., all of the chunks) without consideration as to whether a copy of that chunk already exists in the target location corresponding to an earlier version of the file. An exception for downloading all chunks of a file may be if an attempt to download the file was previously started, and failed, and then the download is restarted (which may be referred to as a retry attempt), or when a file previously downloaded is moved to a new location and named accordingly. Still, small updates to a file that do not change a large portion of the file cannot be transferred without the rest of the file. Furthermore, BitTorrent suffers from lack of a security protocol and bad performance in poor network conditions. There is thus a need to address these issues and/or other issues with prior techniques to improve the transfer of large files over a data network.

SUMMARY

Embodiments of the present disclosure relate to computer systems configured to transfer files between data centers.

In accordance with a first aspect of the present disclosure, a method is disclosed that includes: dividing, using a server device, a source file into a plurality of chunks at least one chunk of the plurality of chunks comprising one or more bytes of the source file; generating, using the server device, first metadata for the at least one chunk; sending, using the server device, the first metadata for the at least one chunk to a client device; receiving, at the server device and based at least in part on a comparison of the first metadata and second metadata corresponding to one or more local chunks of a destination file performed using the client device, a request from the client device to transfer the at least one chunk to the client device; and sending, using the server device, the at least one chunk to the client device.

In an embodiment of the first aspect, the first metadata for the at least one chunk comprises at least one of a chunk identifier, a sequence number indicating an order of the chunk in the source file, an address that points to a location of the chunk in a remote storage server, a hash value corresponding to the contents of the chunk, or a size of the chunk.

In an embodiment of the first aspect, the request includes at least one of an identifier of the at least one chunk or a location of the at least one chunk.

In an embodiment of the first aspect, the method further includes establishing a QUIC connection between a client application executing on the client device and a server application executing on the server device. The at least one chunk is sent to the client device using the QUIC connection.

In an embodiment of the first aspect, the server application implements a BBR (Bottleneck Bandwidth and Round-trip propagation time) algorithm for congestion control on the QUIC connection.

In an embodiment of the first aspect, the server application sets a rate limit of the QUIC connection based on at least one of a priority level of the source file or a priority level of the client device.

In an embodiment of the first aspect, the request comprises an HTTP/3 message.

In an embodiment of the first aspect, a client application executing on the client device is configured to: receive, over a QUIC connection, the first metadata for the at least one chunk from a server application executing on the server; compare the first metadata for the at least one chunk to the second metadata corresponding to the one or more local chunks of the destination file; and generate the request based at least in part on the comparison of the first metadata to the second metadata.

In an embodiment of the first aspect, the comparing the first metadata to the second metadata includes: comparing a hash value for the at least one chunk of the source file to one or more corresponding hash values of the one or more local chunks; determining whether the hash value for the at least one chunk matches any hash values of the one or more corresponding hash values; and responsive to determining that the hash value does not match any of the hash values of the one or more corresponding hash values, selecting the at least one chunk of the source file to be included in the one or more chunks associated with the request.

In an embodiment of the first aspect, the client device is configured to obtain a JSON (Javascript Object Notation) web token from an Authentication and Authorization (AA) service. The sending the first metadata to the target endpoint is performed responsive to receiving a metadata request from a client application executing on the client device, the metadata request including the JSON web token, and the JSON web token is verified by a server application executing on the server device prior to the sending the first metadata to the client application.

In an embodiment of the first aspect, the request includes the JSON web token.

In accordance with a second aspect of the present disclosure, a server device is provided that includes: one or more processing units configured to: divide a source file into a plurality of chunks, at least one chunk of the plurality of chunks comprising one or more bytes of the source file; generate metadata for the at least one chunk; send the metadata for the at least one chunk to a client device; based at least in part on the metadata, receive a request from the client device to transfer the at least one chunk to the client device; and send the at least one chunk to the client device.

In an embodiment of the second aspect, the one or more processing units are further to: establish a QUIC connection between the server device and the client device. The at least one chunk is received using the QUIC connection.

In an embodiment of the second aspect, the request comprises a HTTP/3 message.

In an embodiment of the second aspect, the one or more processing units are further to: verify a JSON (Javascript Object Notation) web token received in a metadata request from the client device prior to the metadata being sent to the client device.

In an embodiment of the second aspect, the request includes the JSON web token.

In an embodiment of the second aspect, the server device is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system for generating synthetic data; a system incorporating one or more virtual machines (VMs); a system implemented at least partially in a data center; or a system implemented at least partially using cloud computing resources.

In accordance with a third aspect of the present disclosure, a client device is provided that includes: one or more processing units to: receive, from a server device, first metadata of a source file, the source file being divided into a plurality of chunks comprising at least one chunk; compare the first metadata to second metadata corresponding to one or more local chunk of a destination file; generate, based at least in part on the comparison, at least one request to transfer the at least one chunk of the source file to client device; and send the at least one request to the server device. The first metadata corresponds to the at least one chunk.

In an embodiment of the third aspect, the one or more processing units are further to: establish a QUIC connection with the server device. The at least one chunk is received using at least one HTTP/3 message using the QUIC connection.

In an embodiment of the third aspect, the one or more processing units are further to: obtain a JSON (Javascript Object Notation) web token from an Authentication and Authorization (AA) service; and send, prior to the receipt of the metadata, a metadata request including the JSON web token to the server device.

In an embodiment of the third aspect, the at least one request includes the JSON web token.

In an embodiment of the third aspect, the server device is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The present systems and methods for implementing processes using a coroutine suspension mechanism are described in detail below with reference to the attached drawing figures.

DETAILED DESCRIPTION

Figure 1A:
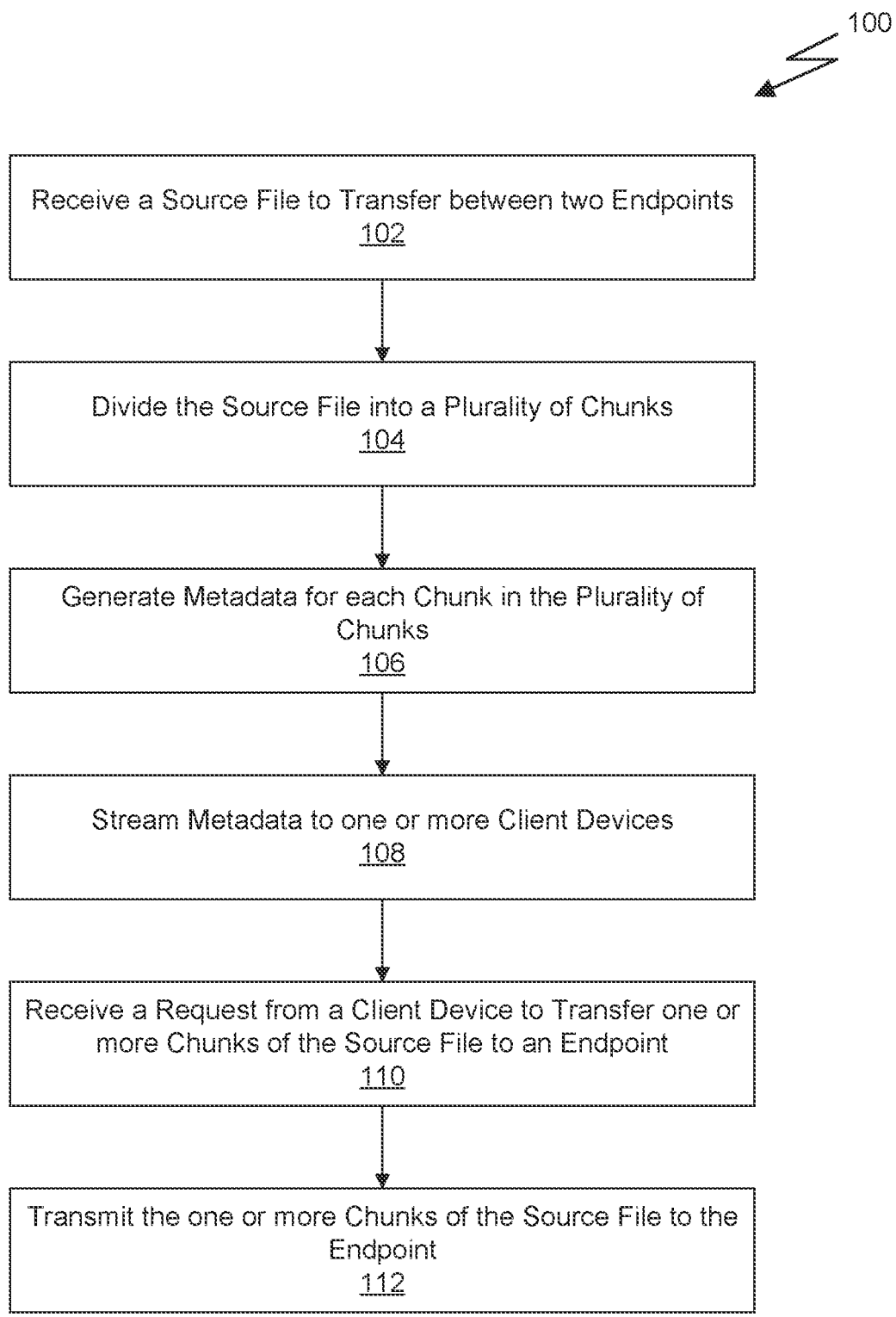
FIG. 1A illustrates a flowchart of a method performed by a server application for transferring large files over a network, in accordance with at least one embodiment.

Systems and methods related to transferring large files over a network are disclosed herein. The following describes a client-server framework developed to securely transfer large files between data centers.

The client-server framework solves the problem posed by poor connection issues by implementing a congestion control algorithm. In an embodiment, the framework uses a QUIC transport layer, which enables a BBR (Bottleneck Bandwidth and Round-trip propagation time) algorithm to be used for congestion control. The BBR algorithm is robust against packet loss and high latency, details of which can be found at Cardwell, N. et al., "BBR Congestion Control," Internet Engineering Task Force, ver. 2, March 2022, which is herein incorporated by reference in its entirety. QUIC is a UDP-based transport layer.

The client-server framework also solves the problem posed by differential file transfer by splitting the files into chunks and generating (cacheable) metadata for each chunk on the fly. In an embodiment, using HTTP/3 (e.g., over QUIC), the client polls the server as needed for additional chunk metadata, and downloads only those chunks that are needed to complete the file. By configuring the server to generate the metadata on the fly, the client can start downloading chunks much faster as the server processes the file, enabling some chunks to be downloaded before the server has completed generating the metadata for all the chunks of the file. As used herein, HTTP/3 refers to a third version of the hypertext transfer protocol, which provides semantics used for a broad range of services over the internet. Although primarily described as using HTTP/3 with respect to the system and methods of the present disclosure, this is not intended to be limiting, and other transmission protocols and/or versions may be used without departing from the scope of the present disclosure. The QUIC protocol supports stream multiplexing and per-stream flow control, allowing packets to be transferred between endpoints along multiple network paths. QUIC also allows for the use of TLS 1.3 (Transport Layer Security, ver. 1.3) for secure transfer of data packets over the multiplexed connection. Although primarily described as using the QUIC protocol with respect to the system and methods of the present disclosure, this is not intended to be limiting, and other protocols may be used without departing from the scope of the present disclosure.

The framework is configured to split a file (e.g., a large file) located in a data center associated with the server (referred to as a remote data center) into smaller chunks, each chunk associated with metadata generated by the server. The client receives the metadata for the chunks and determines whether a chunk matching the metadata is located in the data center associated with the client (referred to as a local data center). A local chunk (i.e., existing in a storage associated with the client) may be determined to match the metadata if a hash value included in the metadata for the remote chunk matches a hash value for the local chunk and if the location of the local chunk relative to other chunks of the destination file (e.g., a sequence value), as indicated in a template file for the destination file, matches the location of the remote chunk relative to other chunks in the source file. The confidence that the local chunk matches the remote chunk, based on the comparison of the metadata, is increased by requiring both the hash values to match as well as the relative location of the chunks to match, reducing the possibility that a hash collision could mischaracterize two different chunks as matching. If the local data center already has a copy of that chunk, based on the comparison of the metadata for that chunk with the metadata for the remote chunk received from the server, then the remote chunk is not retrieved from the remote data center. However, if the local data center does not have a copy of that chunk, then the remote chunk is retrieved from the remote data center. Once all of the chunks for the file have been retrieved and are stored in the local data center, then the file can be made accessible to one or more network services in the local data center.

As the source file is updated, a client may request the source file from the server, and the server is configured to process the updated source file and generate metadata for new chunks that can be streamed to the client in the local data center. The client then retrieves the updated chunks as needed based on the metadata (i.e., by evaluating whether a copy of a local chunk already exists using the metadata). Thus, small updates of large files can be transferred by only transferring the chunks that have changed compared to other chunks that may be the same as chunks included in a previous version of the large file, saving on network bandwidth and enabling files to be transferred more efficiently than with prior art solutions for transferring files over a network.

FIG. 1A illustrates a flowchart of a method 100 performed by a server application for transferring files over a network, in accordance with at least one embodiment. The method 100 may be performed by a server device configured to execute a server application in a client-server framework. Each block of method 100, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few potential implementations. In addition, method 100 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 100 is within the scope and spirit of embodiments of the present disclosure.

At operation 102, a source file is received to transfer between two endpoints. The two endpoints may be, in non-limiting embodiments, a server device and a client device connected via a network. In an embodiment, the source file is stored in a remote storage server, which may be part of a storage area network (SAN) or other content delivery network (CDN). The server device may be connected (e.g., via a local area network (LAN) and/or wide area network (WAN)) to the remote storage server to enable the server device to access the source file. In an embodiment, the source file may be transferred (e.g., copied, sent, etc.) to a memory of the server device for processing.

At operation 104, the source file is divided into a plurality of chunks. Each chunk may include a number of bytes of the source file. For example, each chunk may be, e.g., 4 MB of data included in the source file. In an embodiment, the chunks are adjacent and do not overlap, while in other embodiments there may at least some overlap between at least some of the chunks. Each chunk may also be associated with a chunk identifier and a sequence value that indicates the order of the chunk in the source file.

At operation 106, metadata is generated for each chunk in the plurality of chunks. In addition to the chunk identifier and the sequence value, the chunk may be processed by a hash algorithm, such as SHA-256, MD5, or xxHash (e.g., xxh3_128) to generate a hash value corresponding to the contents of the chunk (e.g., the 4 MB of data). The hash value is associated with the chunk identifier and may be used, along with the chunk location or offset, to compare the remote chunk to copies of local chunks located in a memory associated with the client device.

At operation 108, metadata for a chunk is streamed to one or more client devices. As each chunk is processed by the server device, and the metadata for the chunk becomes available, the metadata can be transmitted to one or more client devices connected to the server device. In one embodiment, a client device may send a metadata request to the server device, and the server device, responsive to the metadata request, transmits or sends the metadata for the chunk to the client device. In an embodiment, the metadata request can include an identifier associated with the source file and/or a destination file corresponding to the source file. In such embodiments, the server device may generate multiple metadata responses for the chunks of the source file as they become available, each metadata response corresponding to one or more chunks (e.g., a subset of chunks) of the source file. In other embodiments, the metadata request may correspond to a single chunk and the metadata response includes metadata for a single chunk. In such embodiments, the client device may send new metadata requests for additional chunks until all chunks of the source file are received.

In some embodiments, the metadata may be streamed to the client device as it becomes available, and the server device may transmit a metadata response to the client device prior to completing the processing of the entire source file. In such embodiments, as soon as the first chunk is completely processed by the server device, the metadata for the chunk can be sent to the client device to enable the client device to determine whether the chunk needs to be downloaded from the server device. The client device can, therefore, begin downloading portions of the source file prior to operation 106 being completed for the entire source file.

At operation 110, a request is received from the client device to transfer one or more chunks of the source file to the client device. The client device may compare the metadata for the remote chunk to metadata for copies of local chunks stored in a memory associated with the client device to determine if the client device already has a local copy of the chunk. If no local copy of the chunk exists, then the client device sends a request to the server device to transfer the one or more chunks to the server device. However, if a local copy of the chunk does exist, then the client device may prevent a request from being generated for the chunk and wait for metadata from the next chunk.

At operation 112, the one or more chunks are transferred to the client endpoint. In an embodiment, the data for the chunks are included in HTTP/3 message bodies and transferred from the server device to the client device. The client device reads the chunk data from the HTTP/3 message bodies and stores the chunk data in the destination file on the local storage server.

Figure 1B:
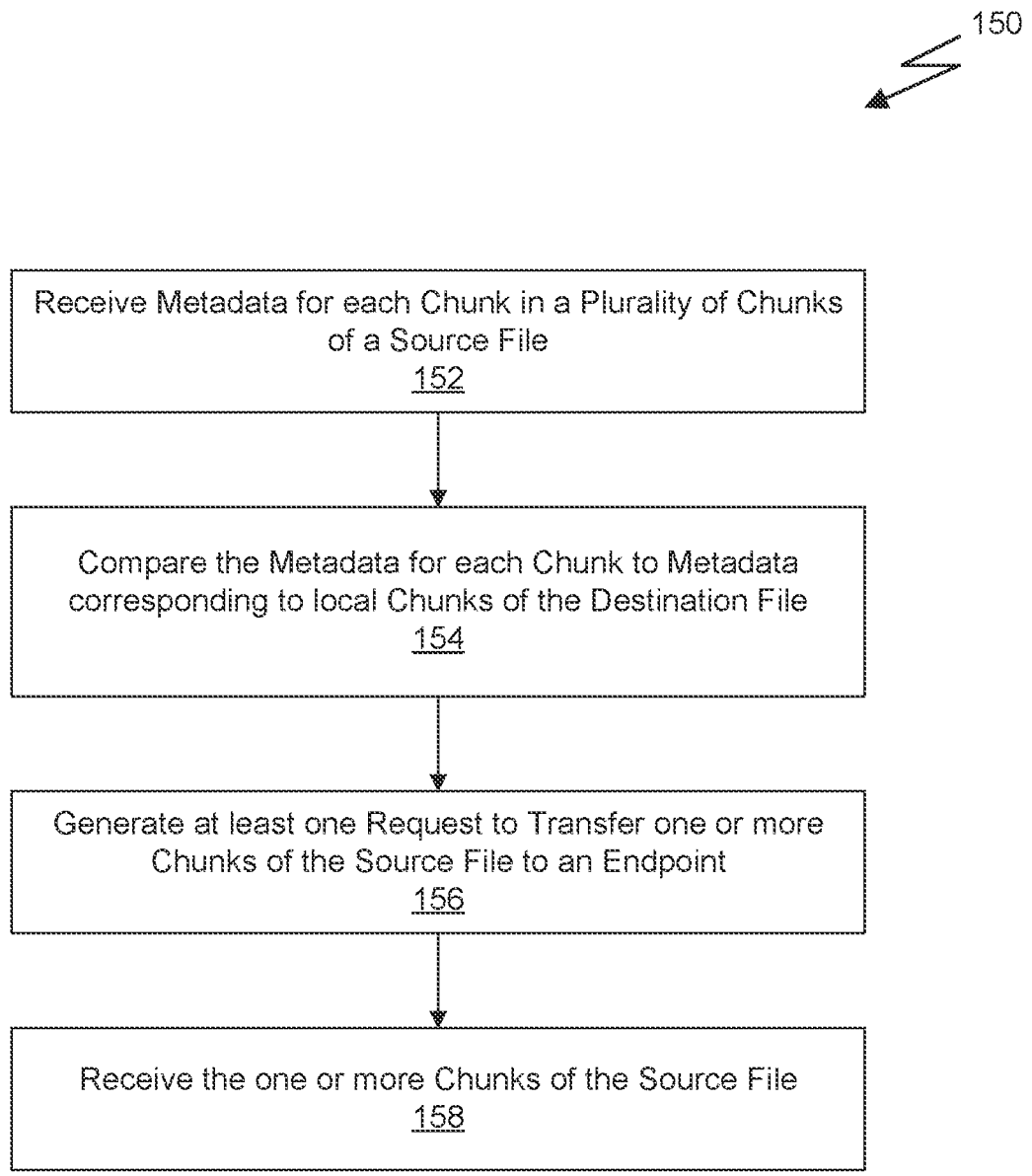
FIG. 1B illustrates a flowchart of a method performed by a client application for transferring large files over a network, in accordance with at least one embodiment.

FIG. 1B illustrates a flowchart of a method 150 performed by a client application for transferring files over a network, in accordance with an embodiment. In an embodiment, the method 150 may be performed by a client device configured to execute a client application in the client-server framework. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few potential implementations. In addition, method 150 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At operation 152, metadata is received for each chunk in a plurality of chunks of a source file. The server device transmits the metadata to the client device as metadata for a source file is generated at the server device. In one embodiment, the client device transmits a metadata request to the server device prior to operation 152, which causes the server device to generate and/or transmit the metadata to the client device.

At operation 154, the metadata for each chunk is compared against metadata corresponding to local chunks of a destination file. In differential file transfer, when a source file is updated, but a large portion of the source file remains the same, a previous copy of the destination file in the local storage server may be used to avoid downloading the entire contents of the updated source file. In this case, a hash value for each chunk of the source file may be compared against hash values included in metadata for chunks of a previous version of the destination file to determine if a local copy of the chunk already exists in a memory associated with the client device (e.g., a local storage server). It will be appreciated that in addition to checking a hash value for the chunk to corresponding hash values of the local chunks, a location of the chunk in the source file, as indicated by a sequence number or chunk offset, can also be compared against a location of each local chunk in the destination file. The chunks match if both the hash values and location of the chunks are the same. If the local copy of the chunk exists, then remote chunk of the source file does not need to be downloaded from the server device and instead the local chunk can be copied into the destination file. However, if the local copy of the chunk does not exist, then the client device may download the remote chunk of the source file from the server device.

At operation 156, the client device generates at least one request to transfer one or more chunks of the source file to the client device. The request can include one or more chunk identifiers, source/destination file identifiers, and/or sequence number or chunk offset values that, in any combination, can be used to identify the chunk or chunks of the source file being requested by the client device.

At operation 158, the client device receives the one or more chunks of the source file. In an embodiment, the chunk data is transmitted from the server device to the client device in the body of HTTP/3 messages over a QUIC connection. In another embodiment, the chunk data may be transferred according to a different transport protocol and/or presentation/application protocol.

It will be appreciated that the server application, executed by a server device, and the client application, executed by a client device, in combination, implement the protocol described herein for transferring data between two endpoints in a network. The messages and data transferred between the client application and the server application may be transferred using, for example and without limitation, a QUIC connection with congestion control, such as a BBR algorithm, in order to improve efficiency of the communication session. Furthermore, the use of HTTP/3 message (over QUIC) can provide both security (using TLS 1.3, for example) and reliability (e.g., by migrating network paths when a path becomes unreliable, reducing packet loss) in the transfer protocol. Furthermore, by splitting the process into one of dividing the file into chunks and first checking the metadata for each chunk to determine whether that chunk is already available to the client device, differential file transfer can improve the efficiency of the transfer of files whenever small updates to the file are made at a central repository.

More illustrative information will now be set forth regarding various optional architectures and features with which the foregoing framework may be implemented. The following information is set forth for illustrative purposes and should not be construed as limiting in any manner. Any of the following features may be optionally incorporated with or without the exclusion of other features described.

Figure 2A:
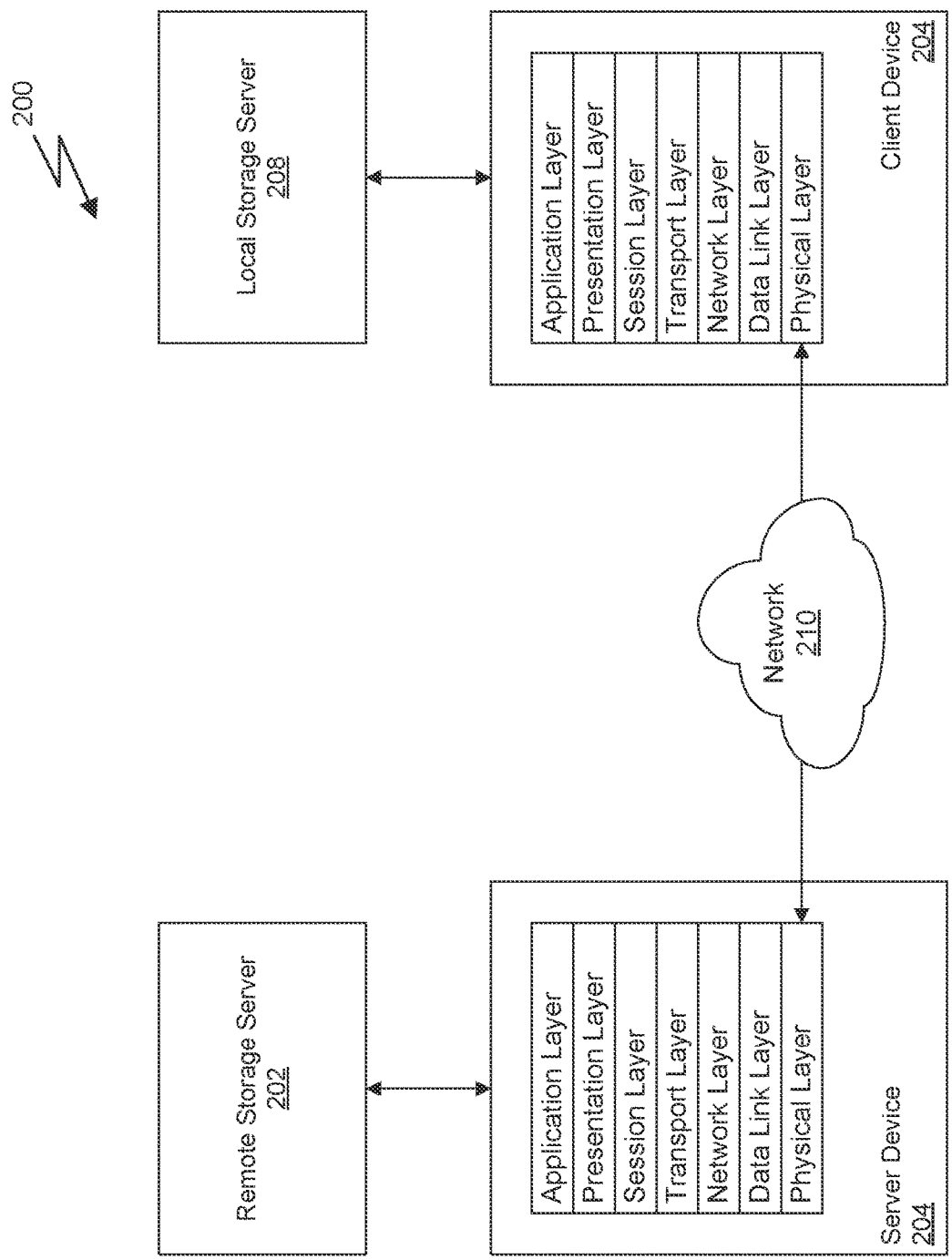
FIG. 2A illustrates a block diagram of an example system suitable for use in implementing some embodiments of the present disclosure.

FIG. 2A illustrates a block diagram of a system 200 suitable for use in implementing some aspects of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by any combination of hardware, firmware, and/or software. For instance, various functions may be carried out by a processor executing instructions stored in memory. Furthermore, persons of ordinary skill in the art will understand that any system that performs the operations of the methods 100 and 150 is within the scope and spirit of embodiments of the present disclosure. In some embodiments, the system 200 may include similar features, functionality, and/or components as that of parallel processing unit 400 of FIG. 4, processing system 500 of FIG. 5A, system 565 of FIG. 5B, system 555 of FIG. 5C, and/or game streaming system 600 of FIG. 6.

As shown in FIG. 2A, the computer system 200 includes a remote storage server 202, a server device 204, a client device 206, and a local storage server 208. The remote storage server 202 and/or the local storage server 208 may each comprise one or more processors, a memory, a network interface, and a number of storage devices communicatively coupled to the one or more processors and/or the memory. The storage devices can include hard disk drives, solid state drives, flash memory devices, optical storage devices, tape storage devices, and the like. The processors may access files stored in the storage devices and transfer a portion or all of the file contents (e.g., data) to other devices via a network 210.

The network 210 includes one or more network devices such as routers, switches, and the like communicatively coupled via one or more physical layers. Communication between network devices can be performed via wired or wireless mediums, such as through an IEEE 802.3 Ethernet wired link or an IEEE 802.11 wireless link, or any combination thereof.

The server device 204 may include one or more processors and a memory. The memory stores instructions for a server application that, responsive to being executed by at least one processor, cause the server device 204 to implement the functionality embodied in the server application. The client device 206 may also include one or more processors and a memory. The memory stores instructions for a client application that, responsive to being executed by at least one processor, cause the client device 206 to implement the functionality embodied in the client application.

The server application and the client application communicate over the network 210 in accordance with one or more protocol layers, which may be referred to as a protocol stack. The protocol layers can include a physical layer, a data link layer, a network layer, a transport layer, a session layer, a presentation layer, and/or an application layer. It will be appreciated that the protocol stack described above is merely one such example of a set of services that are layered and interact to enable communications between applications via a network. In some embodiments, services may be implemented that combine functions of two or more layers of the protocol stack highlighted above. For example, HTTP/3 can sometimes have aspects common to some services of the presentation layer and other services of the application layer. Any protocol stack for implementing the features of the described embodiments is contemplated as being within the scope of the present disclosure.

In an embodiment, the server device 204 and the client device 206 each implement the protocol stack described herein. For example, each of the server device 204 and the client device 206 may implement a physical layer that includes an interface to the network 210. The physical layer of the server device 204 can be the same or different from the physical layer of the client device 206. For example, one or more of the server device 204 and the client device 206 may include a network interface card (NIC) that includes a chip configured to interface the link layer with the functions of line modulation for an Ethernet connection. In some cases, the NIC may also implement the data link layer in addition to the physical layer. The data link layer generates frames transmitted between nodes within a local area network (LAN). The data link layer may also implement a media access control (MAC) sublayer, which includes physical addressing using MAC addresses for indirect communication between nodes of the LAN. The physical layer and data link layer can be implemented by services, such as those that are well-known in the art.

In an embodiment, the server device 204 and the client device 206 implement a network layer based on an Internet Protocol (IP). The network layer enables data packets to be routed outside of the boundaries of the LAN, such as in a wide area network (WAN) such as the Internet. In an embodiment, the network layer uses IPv6 addresses to identify nodes in the WAN.

In an embodiment, the server device 204 and the client device 206 implement a transport layer based on the QUIC protocol. The QUIC protocol uses UDP (user datagram protocol) datagrams to better facilitate deployment in legacy networks. Application protocols, such as HTTP/3, exchange information over a QUIC connection via one or more streams. Each stream is an ordered sequence of bytes, and streams can be bidirectional or unidirectional. QUIC also provides a feedback mechanism to implement reliable delivery and congestion control. QUIC connections are not strictly bound to a single network path, and connection migration uses connection identifiers to allow connections to transfer to a new network path when congestion causes issues with delivery of UDP datagrams on an existing network path.

As used herein, a QUIC connection refers to a connection between two endpoints in a network. A connection ID is used to identify different connections for a particular endpoint, and each connection can be associated with a different network path. QUIC connections can also be migrated to a new network path in the event of network congestion.

The QUIC connection can be associated with multiple streams, allowing different applications (or the same application) to send data on different streams. Different streams can be associated with different priorities, enabling some streams to use more network bandwidth than other streams. Each stream is also associated with a stream ID, that is unique for all streams within a QUIC connection. The stream ID can also indicate whether the stream is initiated by the client or the server, and whether the stream is unidirectional or bidirectional.

A stream frame encapsulates data sent by an application, such as the server application or the client application. An endpoint uses the stream ID and an offset field in the stream frame header to sequentially arrange data in one or more frames. Endpoints may buffer data in a byte stream to allow for out-of-order resequencing.

QUIC connections also implement flow control by advertising the size of a receive buffer implemented by each endpoint. A transmitter endpoint limits both the number of bytes that can be sent in a single stream to ensure a single stream cannot consume the entire receive buffer and a total number of bytes sent in all streams over a connection to ensure that the receive buffer isn't overflowed. These limits can be set during a handshake procedure in which the size of the receive buffers are exchanged by the endpoints.

The QUIC connection may also implement encryption by establishing a shared secret during the handshake procedure. A cryptographic protocol can then be used to encrypt data transmitted within the streams. In an embodiment, QUIC uses TLS 1.3 as the cryptographic protocol.

Additional details of the QUIC protocol can be found in Iyengar, J. et al., "QUIC: A UDP-Based Multiplexed and Secure Transport," Internet Engineering Task Force, RFC 9000, May 2021, which is herein incorporated by reference in its entirety.

In an embodiment, the server device 204 and the client device 206 implement a session layer that establishes a session between a client application and a server application. While multiple applications can use the same QUIC connection to communicate (e.g., via different streams) between the same two endpoints, a session is established between one application on the server device 204 (e.g., the server application) and one application on the client device 206 (e.g., the client application).

The server device 204 and the client device 206 may also implement at least one of a presentation layer and/or an application layer. In an embodiment, the client application and the server application communicate using HTTP/3. HTTP/3 defines a set of messages or message types sent between the applications. For example, a client application may send a HTTP/3 request message to a server application on a bidirectional QUIC stream initiated by the client. The server then sends zero or more interim HTTP/3 response messages followed by a single final HTTP/3 response message on the client-initiated stream. A server may push HTTP/3 response messages to the client on a server-initiated unidirectional QUIC stream. Each HTTP/3 message (request or response) includes a header as a single header frame, (optionally) content (e.g., payload) as a series of data frames, and (optionally) a trailer section as a single header frame.

Additional details of the Hypertext Transfer Protocol Version 3 can be found in Bishop, M. et al., "Hypertext Transfer Protocol Version 3 (HTTP/3)," Internet Engineering Task Force, v. 34, Feb. 2, 2021, which is herein incorporated by reference in its entirety.

The server device 204 and the client device 206 can communicate via the above described protocol stack in order to implement various protocols or processes carried out between the server application and the client application. For example, a process for identifying a file to be differentially transferred over the network, retrieving metadata for a set of chunks of the file, and requesting one or more chunks to be transmitted to the client application based on the metadata can be implemented via the exchange of HTTP/3 messages between the client application and the server application.

In some embodiments, one or more of the server device 204 and/or the client device 206 may include a parallel processing unit such as a graphics processing unit (GPU), vector processing unit (VPU), tensor processing unit (TPU), or the like. The parallel processing unit may be used to improve the efficiency of certain processes amenable to parallel execution. For example, splitting a large file into smaller chunks and generating metadata could potentially be implemented by processing multiple chunks concurrently or simultaneously using multiple cores of the parallel processing unit, each core configured to process one or more chunks of the file. In at least one embodiment, the parallel processing unit(s) may be similar to that of PPU 400 of FIG. 4, described in more detail below.

Figure 2B:
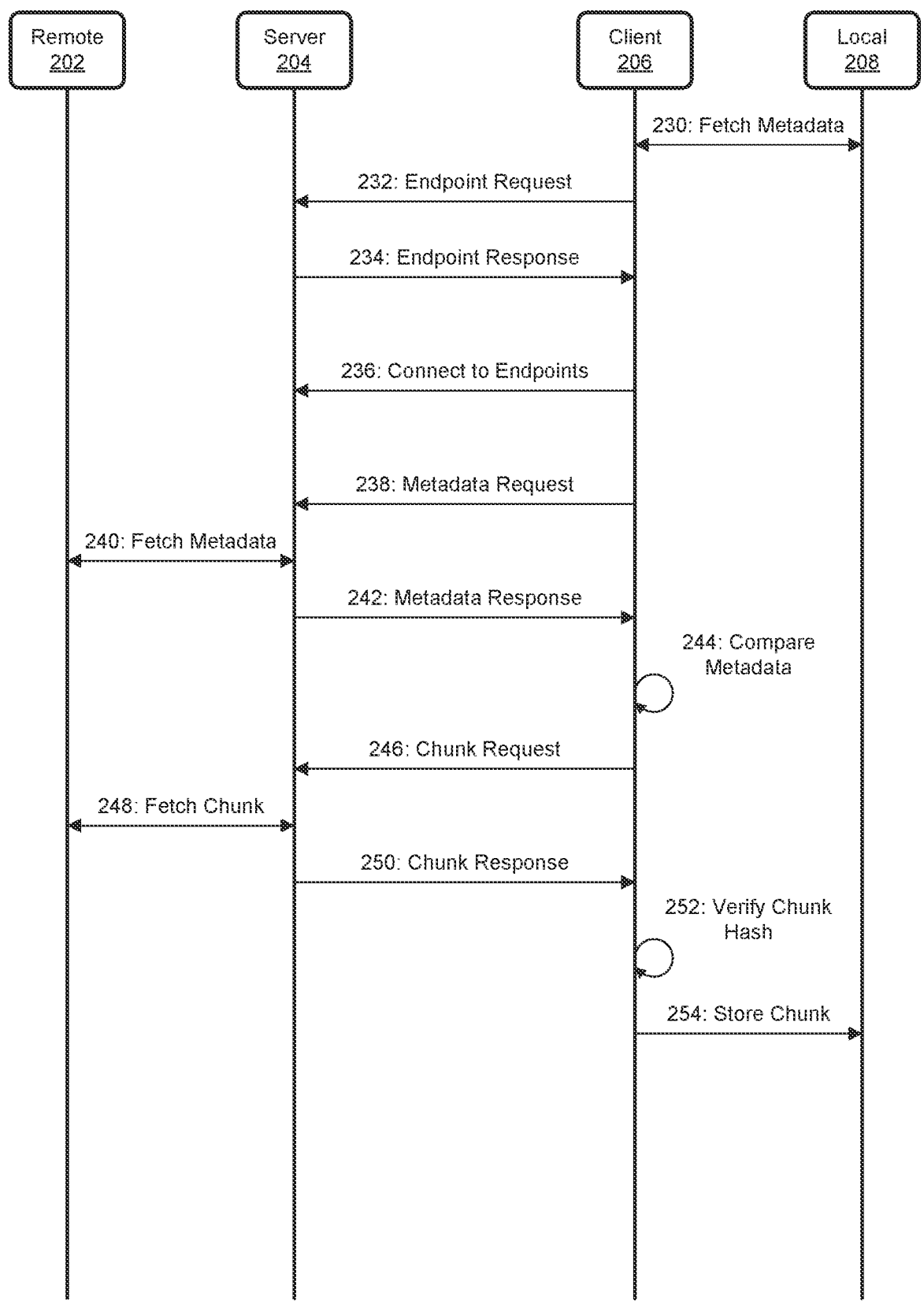
FIG. 2B illustrates a procedure for requesting and transmitting files between endpoints, in accordance with at least one embodiment.

FIG. 2B illustrates a procedure for requesting and transmitting files between endpoints, in accordance with at least one embodiment. The procedure is performed, at least in part, by transferring (e.g., HTTP/3) messages between the server device 204 and the client device 206 using a protocol stack, such as the protocol stack described herein at least with respect to FIG. 2A.

As shown in FIG. 2B, a client device 206 instantiates a client application In an embodiment, the local storage server 208 stores files, where each file is associated with a local template file. The template file indicates a number of chunks that make up the file as well as an order of the chunks in the file. Each chunk includes a number of bytes (e.g., 2, 4, 6, 8, etc. MB) of the full file. Each file is associated with a file identifier (e.g., a file name and/or an unsigned value such as a 64 bit value). The template file may include an indication of the number, order, and location of chunks that make up the file stored in the local storage server 208. In some embodiments, the file may not be stored in a contiguous portion of memory in the physical storage devices included in the local storage server 208. As such, chunks that make up the file can be stored out-of-order and at discontinuous locations in the memory space of one or more physical storage devices.

As used herein, a destination file refers to a copy of a file stored in the local storage server 208 and/or a future copy of a source file that is to-be-migrated from the remote storage server 202. At 230, the client device 206 receives a request to request a file from the server device, which will be stored in the local storage server 208 and can be referred to as the destination file. If the destination file already exists in the local storage server 208, then the client application may fetch a template file corresponding to the destination file from the local storage server 208. However, if a copy of the destination file does not exist in the local storage server 208, then the client device 206 requests metadata for the source file from the server device 204.

The template file may include a chunk identifier and metadata for each chunk in the destination file. The template file may also specify an order for chunks that make up the destination file. Alternatively, in some embodiments, the template file may include a chunk identifier and a pointer to a location of the metadata for each chunk of the destination file, where the metadata for each chunk may be stored separately from the template file. Once the client device 206 has received the contents of the template file for the destination file (if it exists), at 232, the client device 206 transmits an endpoint request to the server device 204.

In an embodiment, the server device 204 can include a cluster of server devices, each server device in the cluster of server devices corresponds to one or more remote storage servers 202. Different source files can be stored on different remote storage servers 202. In an embodiment, the endpoint request includes a file identifier corresponding to the destination file located in the local storage server 208, which matches a file identifier corresponding to a source file located in one or more remote storage server(s) 202. If the destination file does not yet exist in the local storage server 208, then the file identifier for the source file may be provided to the client application (e.g., by a network administrator or through a separate message from the server application indicating the source file exists, has been updated, or should be fetched from the remote storage server 202).

At 234, the server device 204 transmits an endpoint response to the client device 206. The endpoint response includes identifiers (e.g., IP addresses) for one or more endpoints (e.g., storage servers in the cluster) corresponding to the endpoint request. In an embodiment, the storage server 204 receiving the request looks up identifiers for endpoints corresponding to the file identifier of the destination file and/or source file. In some cases, a copy of the source file corresponding to the destination file can be stored redundantly on different remote storage servers 202, and each of the remote storage servers 202 can be associated with a corresponding server device 204 identified as one of the endpoints. The endpoint response, therefore, will return a number of identifiers to the client device 206 that the client device 206 can connect to in order to retrieve a copy of the source file. In another embodiment, the source file is stored in a particular remote storage server 202, and the endpoint response includes a single identifier for an endpoint corresponding to that remote storage server 202. The client device 206 will then use the identifier for that endpoint to connect to a corresponding server device 204.

In yet other embodiments, the server device 204 comprises one of a number of server gateway devices that act as a front end for the cluster of server devices. The server gateway device routes the endpoint request to a corresponding server device in the cluster based on the file identifier included in the endpoint request. The corresponding server device in the cluster then generates the endpoint response and transmits the response to the server gateway device to forward back to the client device 206.

At 236, the client device 206 establishes a connection to one or more endpoints indicated in the endpoint response. In an embodiment, a client application on the client device 206 establishes a QUIC connection with a server application on each of the one or more endpoints. It will be appreciated that connections to multiple endpoints can be established in order to ensure availability of at least one connection and access to the contents of the source file. If one connection becomes unavailable, then the client application can resend a HTTP/3 message to a different endpoint through a different connection. Furthermore, the client device 206 can monitor the quality of the connections to prioritize the use of better connections over poorer connections. For example, if one connection is experiencing high network traffic, the client device 206 may detect that high packet loss is occurring on that connection. Another connection may be available that has lower network traffic and lower latency, so the client device 206 may transfer message traffic to that connection to continue the process. The connection experiencing high network congestion may be kept open (e.g., idle, available, etc.) so that new messages may be sent using that connection if the network traffic subsides.

It will be appreciated that the client device 206, via the client application, can establish a connection with one server device 204 for operation 232 and 234, while establishing a connection at operation 236 with a separate and distinct server device 204 in the cluster. In both cases, the client application may establish a QUIC connection with a corresponding server application executed on the different server devices 204 in order to perform the corresponding operations of the process (e.g., through the exchange of HTTP/3 messages).

The following may be described as assuming a single QUIC connection is established between a client application on the client device 206 and a server application on the server device 204. However, it will be appreciated that any of the following operations may be performed using more than one QUIC connection between the client application and different instances of the server application on different server devices 204. For example, the client device 206 may transmit copies of a same message to two or more server devices 204 sequentially or concurrently in order to increase the probability that the client device receives a response. Similarly, the client device 206 may transmit messages related to different chunks to different server devices 204 in order to exploit parallelism and retrieve two different chunks at substantially the same time by receiving interleaved HTTP/3 message frames from two or more server devices 204. Nevertheless, the following description will describe each operation within the context as being performed between a single client device 206 and a single server device 204, to avoid obscuring these aspects of the disclosure.

At operation 238, the client device 206 transmits a metadata request to the server device 204. The metadata request includes a file identifier corresponding to a destination file that the client device 206 wants to update in the local storage server 208. It will be appreciated that the selection of a particular destination file can be automated or manual. For example, the client application can be configured to track a plurality of destination files located in the local storage server 208, and request metadata corresponding to the destination files periodically (e.g., once per day, once per week, etc.) in order to determine whether the source files corresponding to the destination files have been updated in the remote storage server 202. Alternatively, a network administrator of the local storage server 208 can use the client application to request the metadata for a particular destination file at any point in time. Furthermore, if a source file stored in the remote storage server 202 has not yet been downloaded to the local storage server 208, then the network administrator can request the metadata using a file identifier corresponding to the source file even though a corresponding destination file does not exist on the local storage server 208. Of course, in some embodiments, the server application can push a list of file identifiers for source files located in the remote storage server 202 to the client application, and the client application can automatically request metadata for each of the source files, whether or not metadata for a corresponding destination file exists in the local storage server 208.

At operation 240, the server device 204 fetches metadata for a source file from the remote storage server 202. In an embodiment, upon receiving the metadata request for a source file, the server application can determine whether the source file has been chunked. As used herein, the source file has been chunked if the source file has been divided into a number of chunks and metadata has been generated for each chunk. A template file may also be generated when the source file is chunked. The chunks and the template file may be stored in the remote storage server 202.

In some cases, the source file may not have been previously processed by the server application and, therefore, a template file and metadata for the chunks of the source file do not yet exist. In such cases, the server application may read the source file from the remote storage server 202 and process the source file to divide the source file into a number of chunks. Each chunk may include a number of bytes of the source file, and metadata for the chunk may be generated by the server application on the fly as the source file is processed. The metadata may include, but is not limited to, a chunk identifier, a sequence number indicating an order of the chunk in the source file, an address (e.g., a uniform resource identifier (URI), uniform resource locator (URL), or the like) that points to a location of the chunk in the remote storage server 202, a hash value corresponding to the contents of the chunk, a size of the chunk, and/or any other information that is relevant to the chunk.

At operation 242, the server device 204 transmits a metadata response to the client device 206. In an embodiment, the metadata response may include a template file for the source file, which includes metadata for each of the chunks that comprise the source file. In another embodiment, the server application generates multiple metadata responses, each metadata response corresponding to one or more chunk(s) of the source file and including metadata corresponding to the one or more chunk(s). Thus, in the case where the server application is generating metadata for chunks on the fly, a metadata response for each chunk can be generated by the source application after each chunk is processed (e.g., after the metadata is generated for the chunk by, e.g., hashing the contents of the source file for that chunk).

At operation 244, the client application compares the metadata received in the metadata response to metadata corresponding to local chunks of the destination file fetched at 230. Again, if no local template file exists, because the destination file does not exist in the local storage server 208, then the chunk(s) corresponding to the metadata response should be requested from the sever device 204 and/or the remote storage server 202. Assuming that a template file corresponding to the destination file was fetched at 230, then, at 244, the client application compares the metadata for a chunk received in the metadata response to the metadata for chunks in the local template file. For example, the client application may compare a hash value for the remote chunk to the corresponding hash values for local chunks located in the local storage server 208 to determine if a copy of the chunk may already exist in the local storage server 208. If local chunk has a hash value that matches a hash value for the remote chunk, then the client application may further compare a location of the local chunk relative to the destination file (e.g., a sequence number value, chunk offset, etc.) to a location of the remote chunk relative to the source file, to determine whether the local chunk in the local storage server 208 matches the remote chunk in the remote storage server 202. If the local chunk is a match, then the client application can omit requesting the copy of the remote chunk from the remote storage server 202, and compare metadata for a next chunk of the metadata response. In this manner, the client application avoids downloading copies of chunks of the source file that already exist locally in the local storage server 208, either because at least a portion of the source file was previously downloaded by the client device 206 or because a previous version of the destination file that included matching chunks already exists in the local storage server 208. By comparing a hash value of the chunk as provided by the server application with a local hash value retrieved by the client application, the client application can determine whether the contents of the chunk are likely the same (assuming very low probability of hash collisions based on the selected hash algorithm). Further comparison of the relative locations of the chunks can increase confidence that the chunks match.

However, if a copy of the chunk does not exist in the local storage server 208, then, at 246, the client device 206 transmits a chunk request to the server device 204. In an embodiment, the chunk request 246 includes an identifier of the chunk being requested from the remote storage server 202 and/or a location of the chunk in the remote storage server 202, each of which may have been included in the metadata response.

At operation 248, the server device 204 fetches the chunk from the remote storage server 202. At operation 250, the server device 204 transmits the chunk to the client device 206. In an embodiment, the server device 204 encapsulates the contents of the chunk in one or more HTTP/3 messages transmitted to the client device 206 as the chunk response. In another embodiment, the server device 204 may transmit information in an HTTP/3 message that can be used by the client device 206 to retrieve the chunk via a separate connection (e.g., through a direct QUIC connection with the remote storage server 202).

Once the client device 206 has received the full data for the chunk, at operation 252, the client device 206 verifies the chunk hash. In an embodiment, the client device hashes the contents of the chunk to compare the resulting hash value to a hash value for the chunk included in the metadata response at 242. If the hash value is verified (e.g., the hash values match), then, at 254, the chunk can be stored in the destination file in the local storage server 208.

Operations 242-254 can be repeated for additional chunks for the same or additional metadata responses received from the server application. Once all of the remaining chunks of the source file are received, the client device 206 can verify that the full destination file has been correctly migrated to the local storage server 208. In an embodiment, the template file for the destination file may be hashed to generate a global hash value for the destination file. The global hash value may be compared to a global hash value for the source file that was transmitted to the client application as part of one or more metadata responses. In another embodiment, the client application may hash all of the chunks of the destination file stored in the local storage server 208 to generate a global hash value for the entire destination file. This global hash value can then be compared against a corresponding global hash value generated by the server application for the source file when the source file was initially processed by the server application. In yet another embodiment, the global hash value can be generated by the client application by hashing the hash values for the chunks, in order, that make up the destination file. A corresponding global hash value for the source file is generated in the same fashion by the server application. Comparing these global hash values can ensure that the destination file matches the source file.

In an embodiment, the process described above can implement rate limiting based on a priority. When establishing a QUIC connection to transfer the chunks to the client device, the server device 204 can implement a rate limit for a stream based on at least one of a priority level of the source file and/or a priority level of the client device. For example, different source files may be given different priority values (e.g., high/medium/low) based on preference for how fast the file should be transferred. A rate limit for the stream over the QUIC connection can be higher for a high priority source file than a low or medium priority source file. Similarly, different client devices can be associated with different zones, each zone having a different priority. For example, a client device associated with a storage server used for game development in a particular geographical zone may have different priority than a different client device associated with a storage server used for game streaming (e.g., customer facing) in the same or a different geographical zone. Consequently, rate limits used to transfer files to data centers used for game streaming can be higher than those used to transfer files to data centers used for game development or beta testing. It will be appreciated that the rate limit can be set by the server device based on a combination of the priority levels of both the source file and the client device.

Figure 3:
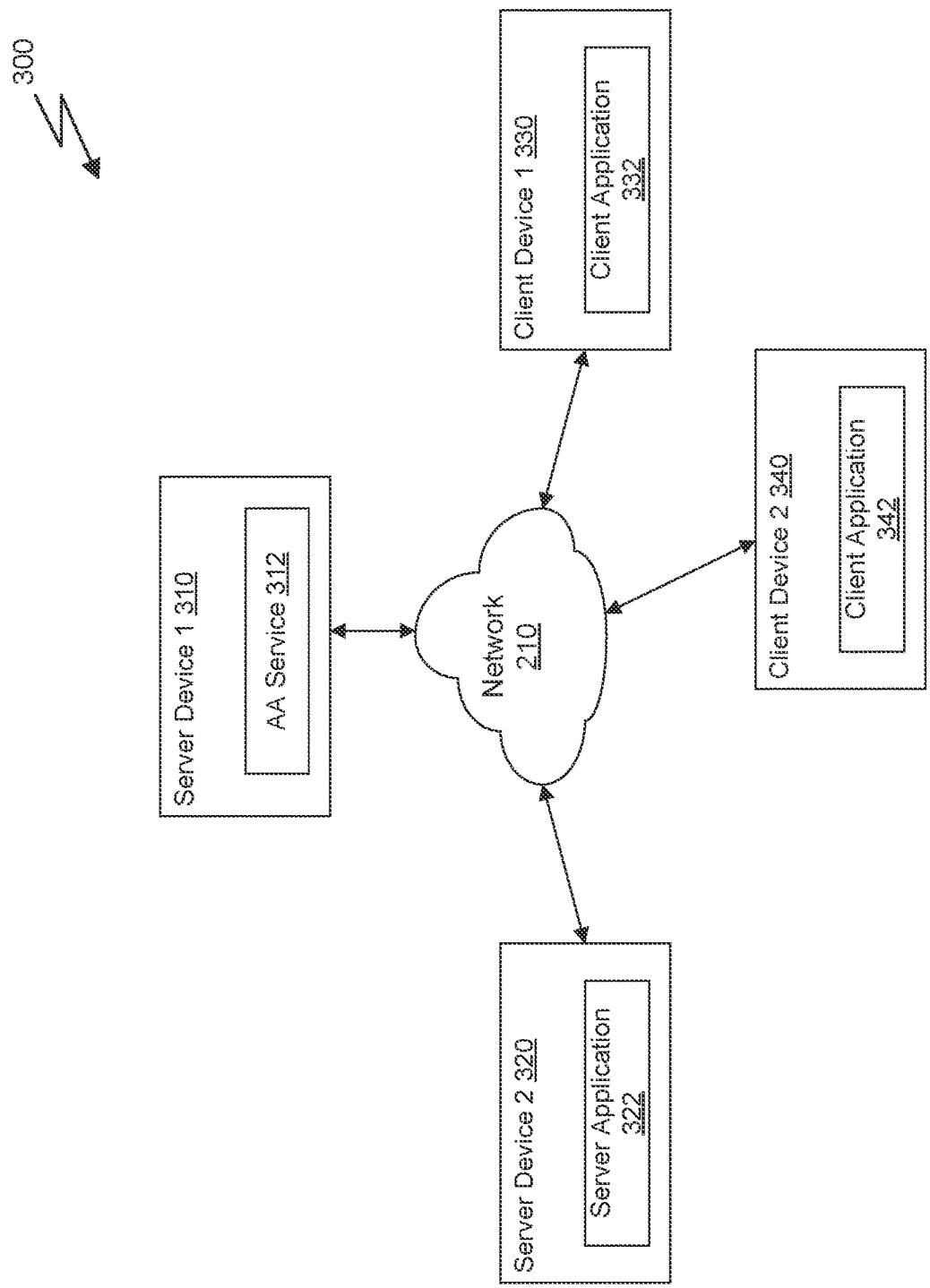
FIG. 3 illustrates a system 300 for implementing authentication and authorization in connection with file transfers, in accordance with at least one embodiment.

FIG. 3 illustrates a system 300 for implementing authentication and authorization in connection with file transfers, in accordance with an embodiment. It will be appreciated that the system 200 described above uses end-to-end encryption using, e.g., TLS 1.3 for communications between the client application and the server application. However, in some embodiments, the service provided by the server application may also want to ensure that only authorized client applications are able to access and download files from the remote storage server 202. In such embodiments, each client device may be associated with a client account, and an authentication and authorization service may be provided by a separate server device in order to restrict access to certain source files.

As shown in FIG. 3A, the system 300 includes a plurality of server devices 310, 320 and a plurality of client devices 330, 340. The first client device 330 includes a first instance of the client application 332 and the second client device 340 includes a second instance of the client application 342. The first server device 310 implements an Authentication and Authorization (AA) service 312, and the second server device 320 includes a server application 322. The server application 322 may be similar to the server application described herein at least with respect to the description of FIGS. 2A and 2B, and the client applications 332, 342 may be similar to the client application described herein at least with respect to the description of FIGS. 2A and 2B.

In operation, prior to establishing a connection with the server application 322, a client application 332, 342 may request a token from the AA service 312. The request can include credentials for the client application 332, 342. The credentials may include a username associated with a user account, and a password for the corresponding user account. The AA service 312 may maintain a list of user accounts and corresponding passwords in order to verify the credentials included in a request. For example, the credentials supplied by client application 332 correspond to a valid user account and the AA service 312 authorizes the client application 332 based on comparing the supplied credentials with stored credentials for the associated user account. Once the AA service 312 has verified the credentials, the AA service 312 may supply a token to the client application 332 for use when communicating with the server application 322. In contrast, when the client application 342 provides different credentials with a separate request sent to the AA service 312, the AA service 312 may determine that the credentials are not associated with a valid user account and/or that the password for the user account does not match the stored password. In such cases, the AA service 312 may provide a response to the client application 342 that the credentials were not verified and a token is not provided with the response.

In an embodiment, the token is a JSON (Javascript Object Notation) web token that indicates the corresponding client application is authorized. In an embodiment, the JSON web token includes permissions for the client application 332. The permissions may be associated with each user account such that different user accounts are only allowed to access certain source files. The permissions can restrict access to a subset of storage locations (e.g., particular server devices or remote storage servers) or a subset of source files (e.g., certain files).

Once a client application 332 has received a token from the AA service 312, the client application 332 can include the token in any communication (e.g., an endpoint request, a metadata request, or a chunk request) transmitted to the server application 322. Upon receiving the token, the server application 322 verifies the token prior to sending a response to the client application 332. If the server device 320 cannot verify the token, then a response may include a message that the client application is not authorized to access the requested information. Otherwise, the server device 320 provides the requested information, such as the endpoint response, the metadata response, and/or the chunk response.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Parallel Processing Architecture

Figure 4:
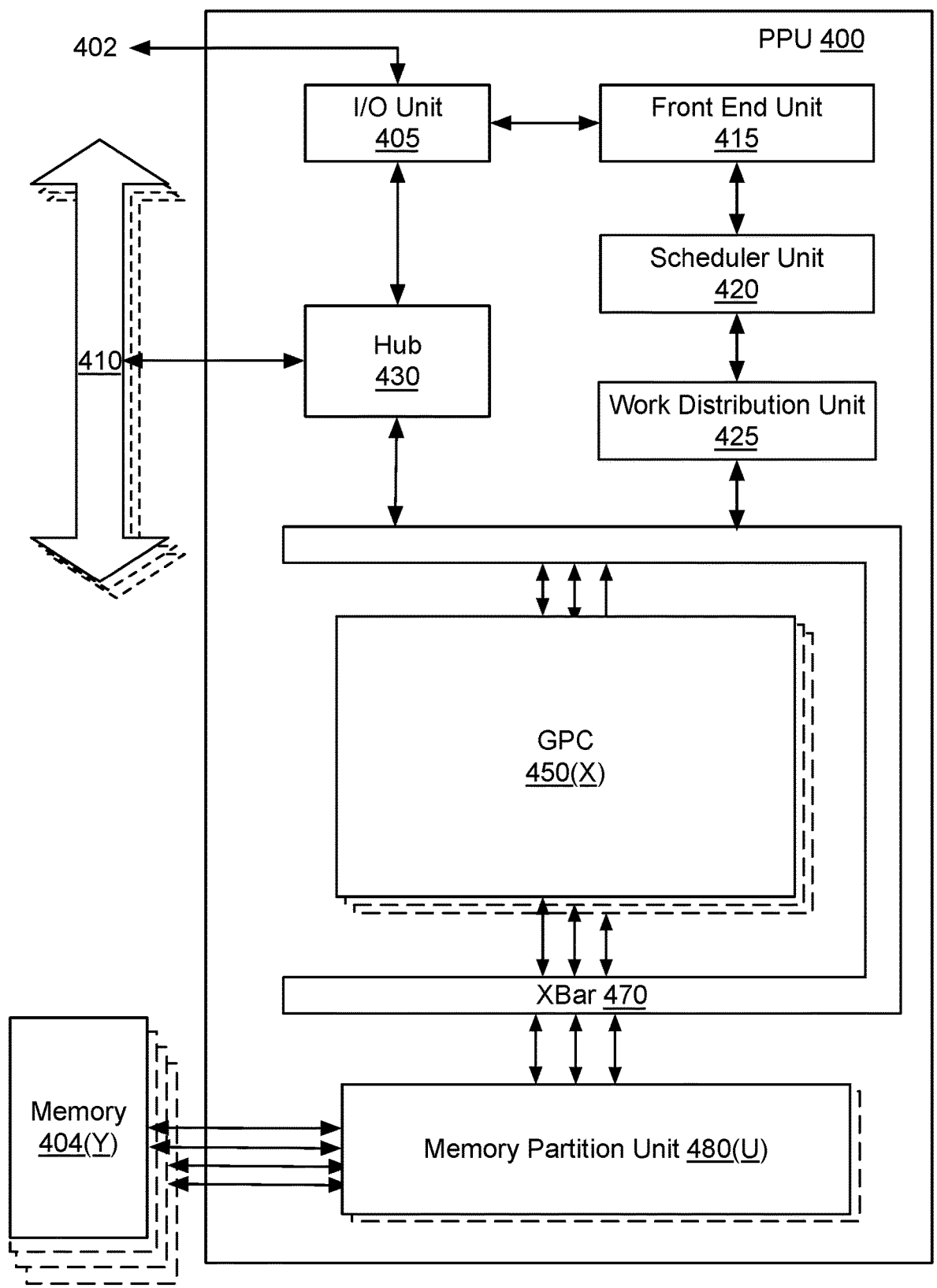
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to execute the coroutine implemented in the machine code generated in method 100. The PPU 400 may also be included in system 200.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be used for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC

450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises Nload store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
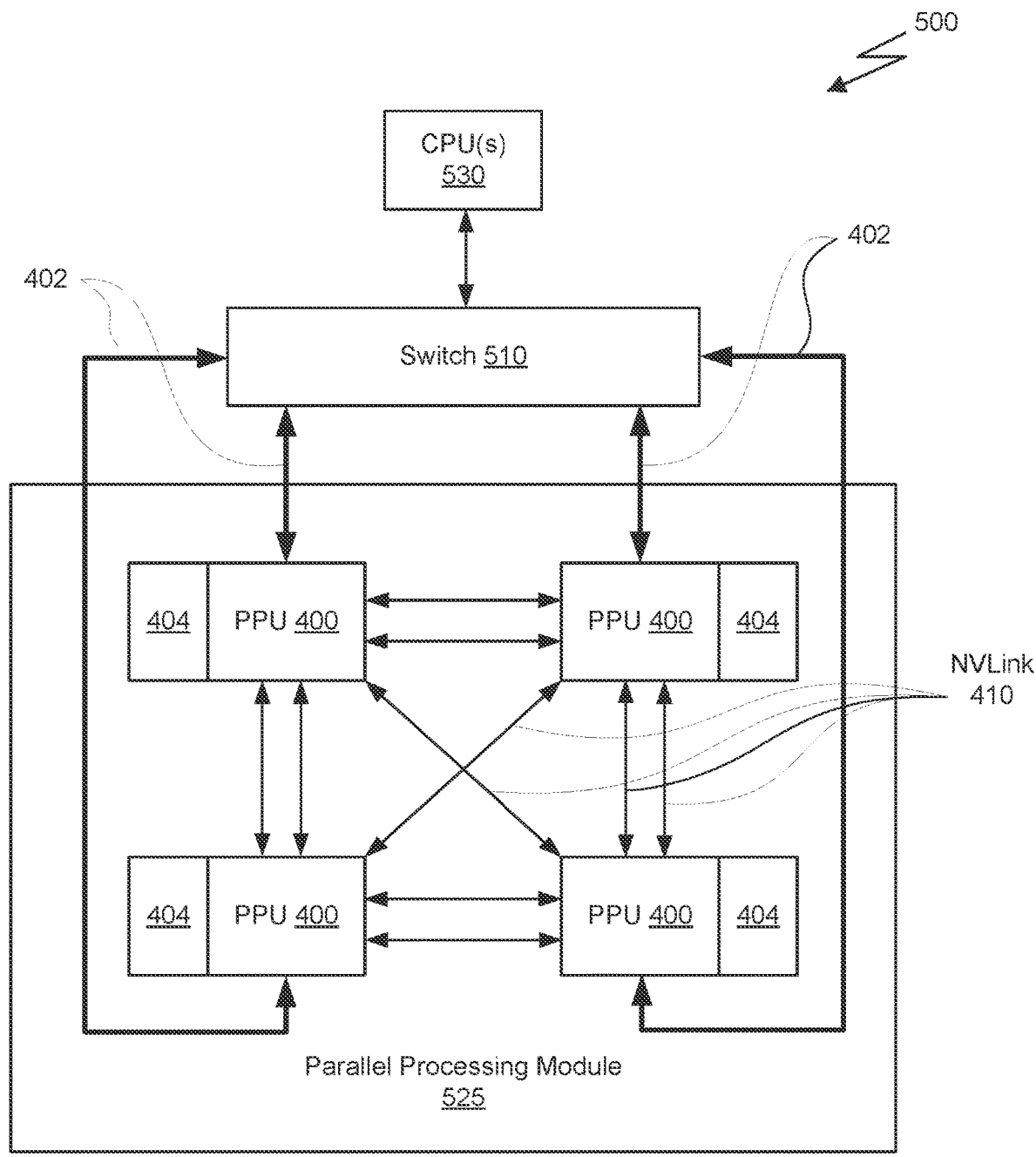
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 100 shown in FIG. 1. The processing system 500 includes a CPU 530, switch 510, and multiple PPUs 400, and respective memories 404.

Figure 5B:
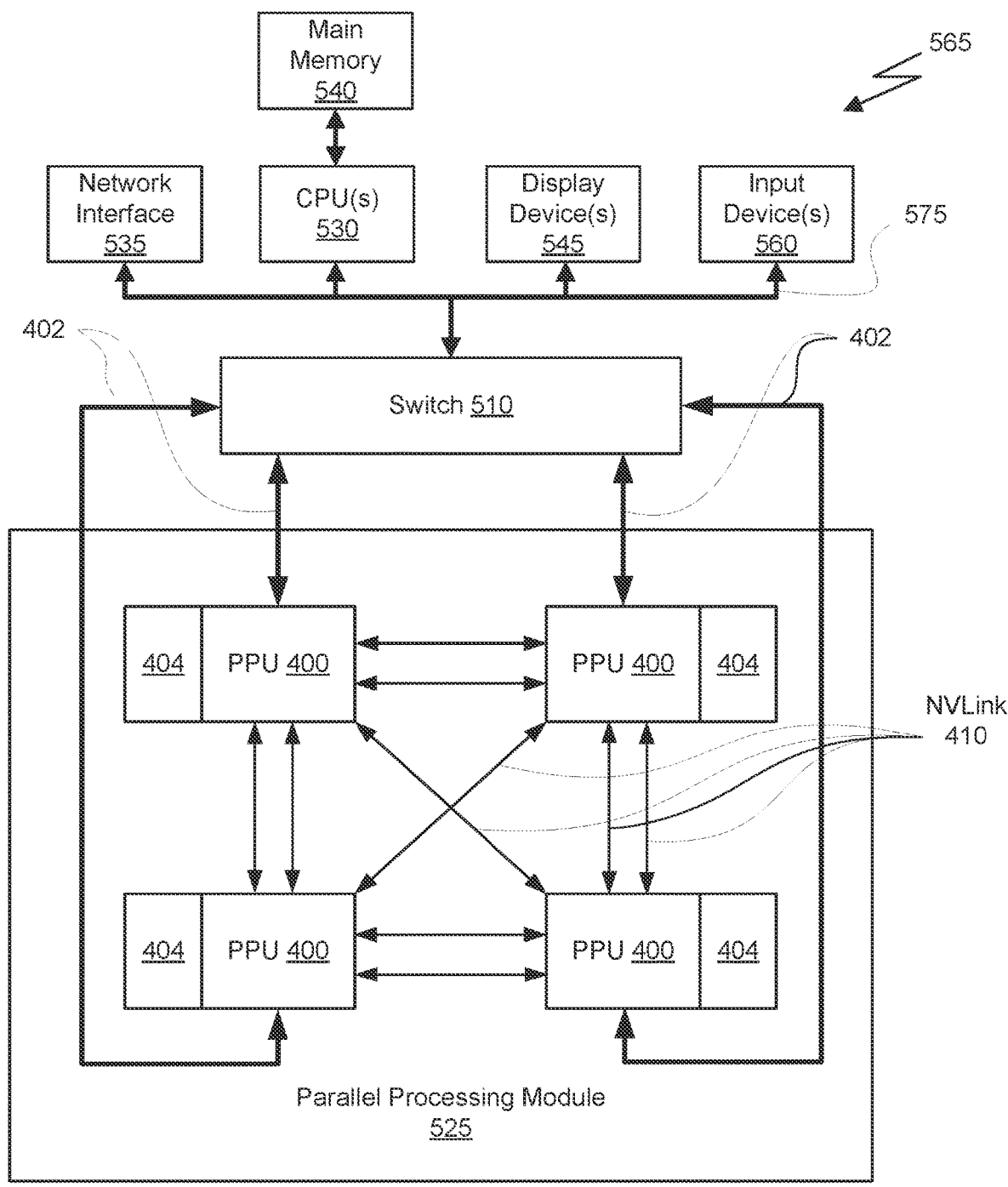
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device)

is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

Figure 5C:
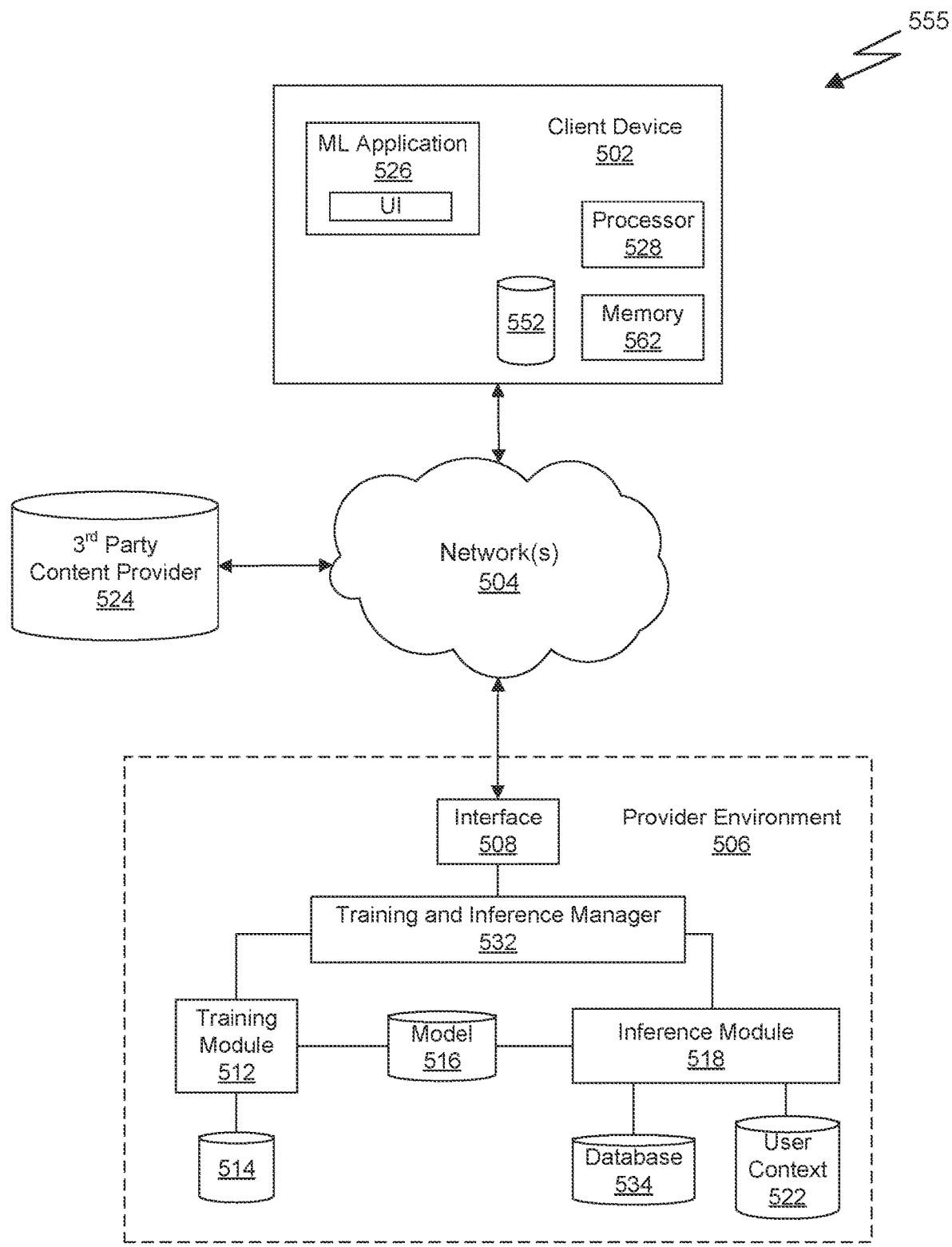
FIG. 5C illustrates components of an exemplary system that can be used to train and use machine learning, in at least one embodiment.

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

FIG. 5C illustrates components of an exemplary system 555 that can be used to train and use machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be used based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can use GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions are generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and use training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Example Game Streaming System

Figure 6:
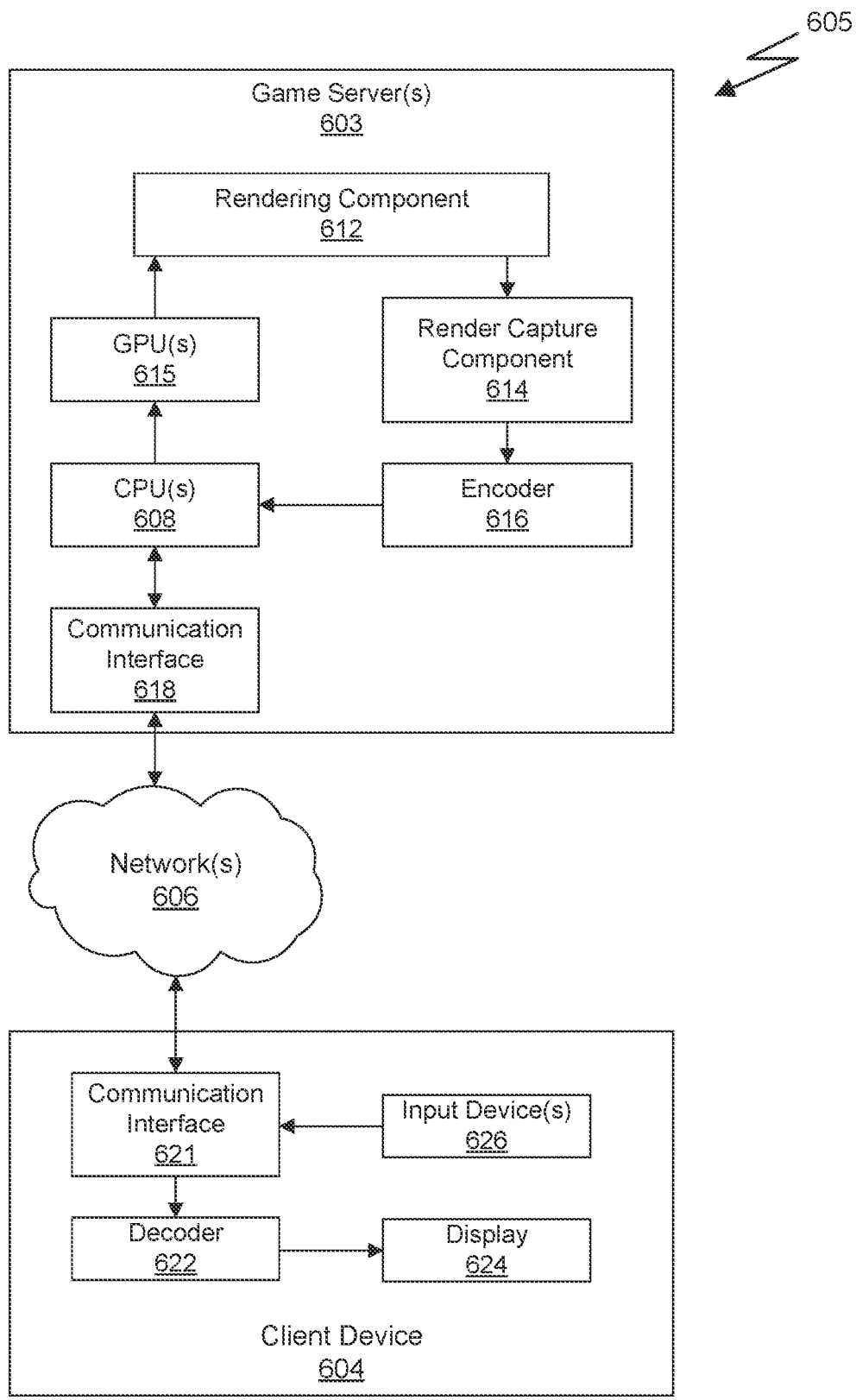
FIG. 6 illustrates an exemplary game streaming system suitable for use in implementing some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    dividing, using a server device, a source file into a plurality of chunks, at least one chunk of the plurality of chunks comprising one or more bytes of the source file;
    generating, using the server device, first metadata for the at least one chunk, wherein the first metadata includes at least: a hash value corresponding to contents of the at least one chunk; and location information indicating an order of the at least one chunk in the source file, wherein the location information comprises at least one of a sequence number or a chunk offset value;
    sending, using the server device, the first metadata for the at least one chunk to a client device;
    receiving, at the server device and based at least in part on a comparison of the first metadata and second metadata corresponding to one or more local chunks of a destination file performed using the client device, a request from the client device to transfer the at least one chunk to the client device, wherein the comparison of the first metadata and the second metadata is based at least on determining whether both the hash value and location information for the at least one chunk match corresponding hash value and location information pairs of the one or more local chunks; and
    sending, using the server device, the at least one chunk to the client device.

2. The computer-implemented method of claim 1, wherein the first metadata for the at least one chunk further comprises, for each chunk in the at least one chunk, at least one of a chunk identifier for the chunk, an address that points to a location of the chunk in a remote storage server, or a size of the chunk.

3. The computer-implemented method of claim 1, wherein the request includes at least one of an identifier of the at least one chunk or a location of the at least one chunk.

4. The computer-implemented method of claim 1, further comprising:
    establishing a QUIC (Quick UDP Internet Connections) connection between a client application executing on the client device and a server application executing on the server device, wherein the at least one chunk is sent to the client device using the QUIC connection.

5. The computer-implemented method of claim 4, wherein the server application implements a BBR (Bottleneck Bandwidth and Round-trip propagation time) algorithm for congestion control on the QUIC connection.

6. The computer-implemented method of claim 4, wherein the server application sets a rate limit of the QUIC connection based on at least one of a priority level of the source file or a priority level of the client device.

7. The computer-implemented method of claim 1, wherein the request comprises an HTTP/3 (Hypertext Transfer Protocol/3) message.

8. The computer-implemented method of claim 1, wherein a client application executing on the client device is configured to:
receive, over a QUIC (Quick UDP Internet Connections) connection, the first metadata for the at least one chunk from a server application executing on the server;
compare the first metadata for the at least one chunk to the second metadata corresponding to the one or more local chunks of the destination file; and
generate the request based at least in part on the comparison of the first metadata to the second metadata.

9. The computer-implemented method of claim 8, wherein the comparing the first metadata to the second metadata comprises:
comparing both the hash value and location information for the at least one chunk of the source file to one or more corresponding hash value and location information pairs of the one or more local chunks of the destination file;
determining whether the hash value and the location information for the at least one chunk matches any corresponding hash value and location information pairs of the one or more local chunks of the destination file; and
responsive to determining that the hash value and location information do not match any of the corresponding hash value and location information pairs of the one or more local chunks of the destination file, selecting the at least one chunk of the source file to be included in the one or more chunks associated with the request.

10. The computer-implemented method of claim 1, wherein the client device is configured to obtain a JSON (Javascript Object Notation) web token from an Authentication and Authorization (AA) service, and wherein the sending the first metadata to the target endpoint is performed responsive to receiving a metadata request from a client application executing on the client device, the metadata request including the JSON web token, and wherein the JSON web token is verified by a server application executing on the server device prior to the sending the first metadata to the client application.

11. The computer-implemented method of claim 10, wherein the request includes the JSON web token.

12. A server device comprising:
one or more processors to:
divide a source file into a plurality of chunks, at least one chunk of the plurality of chunks comprising one or more bytes of the source file;
generate first metadata for the at least one chunk, wherein the first metadata includes at least: a hash value corresponding to contents of the at least one chunk; and location information indicating an order of the at least one chunk in the source file, wherein the location information comprises at least one of a sequence number or a chunk offset value;
send the first metadata for the at least one chunk to a client device;
based at least in part on a comparison of the first metadata and second metadata corresponding to one or more local chunks of a destination file at the client device, receive a request from the client device to transfer the at least one chunk to the client device, wherein the comparison of the first metadata and the second metadata is based at least on determining whether both the hash value and location information for the at least one chunk match corresponding hash value and location information pairs of the one or more local chunks; and
send the at least one chunk to the client device.

13. The server device of claim 12, wherein the one or more processors are further to:
establish a QUIC (Quick UDP Internet Connections) connection between the server device and the client device, wherein the at least one chunk is received using the QUIC connection.

14. The server device of claim 12, wherein the request comprises a HTTP/3 (Hypertext Transfer Protocol/3) message.

15. The server device of claim 12, wherein the one or more processors are further to:
verify a JSON (Javascript Object Notation) web token received in a metadata request from the client device prior to the metadata being sent to the client device.

16. The server device of claim 15, wherein the request includes the JSON web token.

17. The server device of claim 12, wherein the server device is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three dimensional (3D) assets;
a system for performing deep learning operations;
a system implemented using an edge device;
a system implemented using a robot;
a system for performing conversational artificial intelligence (AI) operations;
a system for generating synthetic data;
a system incorporating one or more virtual machines (VMs);
a system implemented at least partially in a data center; or
a system implemented at least partially using cloud computing resources.

18. A client device, comprising:
one or more processors to:
receive, from a server device, first metadata of a source file, the source file being divided into a plurality of chunks comprising at least one chunk, wherein the first metadata corresponds to the at least one chunk and includes at least: a hash value corresponding to contents of the at least one chunk; and location information indicating an order of the at least one chunk in the source file, wherein the location information comprises at least one of a sequence number or a chunk offset value;
compare the first metadata to second metadata corresponding to one or more local chunks of a destination file, wherein the comparison of the first metadata to the second metadata is based at least on determining whether both the hash value and location information for the at least one chunk match corresponding hash value and location information pairs of the one or more local chunks;
generate, based at least in part on the comparison, at least one request to transfer the at least one chunk of the source file to client device; and
send the at least one request to the server device.

19. The client device of claim 18, wherein the one or more processors are further to:
establish a QUIC (Quick UDP Internet Connections) connection with the server device, wherein the at least one chunk is received using at least one HTTP/3 (Hypertext Transfer Protocol/3) message using the QUIC connection.

20. The client device of claim 18, wherein the one or more processors are further to:
obtain a JSON (Javascript Object Notation) web token from an Authentication and Authorization (AA) service, and send, prior to the receipt of the metadata, a metadata request including the JSON web token to the server device.

21. The client device of claim 20, wherein the at least one request includes the JSON web token.

22. The client device of claim 18, wherein the server device is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three dimensional (3D) assets;
a system for performing deep learning operations;
a system implemented using an edge device;
a system implemented using a robot;
a system for performing conversational artificial intelligence (AI) operations;
a system for generating synthetic data;
a system incorporating one or more virtual machines (VMs);
a system implemented at least partially in a data center; or
a system implemented at least partially using cloud computing resources.

* * * * *